2,768,988
VULCANIZATION OF RUBBER IN THE PRESENCE OF SULFENAMIDES

Chester W. Christensen, Akron, Ohio, and Richard O. Zerbe, Nitro, W. Va., assignors to Monsanto Chemical Company, St. Louis, Mo., a corporation of Delaware No Drawing. Application January 2, 1952, Serial No. 264,638

6 Claims. (Cl. 260—786)

The present invention relates to a process of vulcanizing rubber and to the vulcanized rubber products obtained thereby. More particularly it relates to a new and superior class of vulcanization accelerators.

The sulfenamides containing an arylene thiazole substituent are known to possess accelerating properties. These accelerators possess the important attribute of delayed action whereby rubber compositions can be compounded which vulcanize rapidly at vulcanization temperature but are free from any tendency to vulcanize at processing temperature. However, delayed action is not a general attribute of sulfenamides. Sulfenamides of aliphatic thiazoles containing a hydrogen atom on the amide nitrogen atom are active accelerators at relatively low temperatures. The need for accelerators which possess even greater processing safety has recently been intensified by the development of reinforcing furnace blacks since furnace blacks do not possess the retarding characteristics inherent in channel blacks.

It is an object of this invention to provide an improved class of vulcanization accelerators. Another object is to provide a class of vulcanization accelerators having more delayed action than those heretofore available. A further object is to provide accelerators which exert a powerful accelerating action at curing temperatures. A further particular object is to provide a means for safely processing vulcanizable stocks containing a furnace black. Other and further objects will be apparent from the detailed description following.

In accordance with the present invention it has been found that sulfenamides containing an aliphatic thiazole substituent but free of hydrogen on the amide nitrogen atom are powerful accelerators of vulcanization which have little tendency to cure below vulcanizing temperatures. A rubber stock, whether natural or synthetic, containing sulfur and furnace carbon black can be safely processed employing as the accelerator a compound having the structure

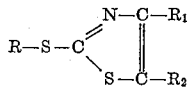

where R represents a secondary amino substituent having the nitrogen linked directly to the sulfur atom. Suitable examples are six membered heterocyclic amino radicals having two $CH_2$ groups linked to the nitrogen as for example piperidine, morpholine and gamma-pipecoline, and dialkyl amino radicals as for example diethyl amino, dimethyl amino, dipropyl amino, diisopropyl amino, dibenzylamino and diphenethylamino radicals. $R_1$ and $R_2$ represent hydrogen or alkyl radicals, at least one of which is an alkyl radical. Alicyclic groups apparently detract from the delayed action properties. For example the sulfenamide from methyl cyclohexylamine proved to be active below the usual curing temperatures. Similarly, non-hydrocarbon substituents on the alkyl group tend to make the compounds active at low temperatures, as for example a cyanoethyl group. Furthermore, substitution on the alpha carbon atom of a heterocyclic group lowers the critical temperature, the sulfenamide from alpha-pipecoline for example being very active as are sulfenamides from heterocyclic groups containing less than six members in the ring such as pyrrolidine.

The new accelerators may be prepared by condensing, in the presence of a mild oxidizing agent, a 2-mercapto thiazole or a mixture of mercapto thiazoles and a secondary amine, as for example dimethyl amine, diethyl amine, dipropyl amine, diisopropyl amine, the dibutyl amines, the diamyl amines, dibenzyl amine, piperidine, methyl ethyl amine, and the like. The alkali metal hypochlorites may be employed as the oxidizing agents as they have been found to give excellent results in this process. However, other oxidizing agents may be used such as hydrogen peroxide, chlorine, potassium ferricyanide, potassium persulfate, and the like.

The following specific examples are to be understood as illustrative of the preparation of the new accelerators and not limitative of the invention.

EXAMPLE 1

36.5 parts by weight (substantially 0.25 mole) of a 15:85 ratio mixture of 2-mercapto-4-ethyl thiazole and 2-mercapto-4,5-dimethyl thiazole was dissolved in 40 parts by weight of a 25% sodium hydroxide solution and to the solution so prepared was added 65 parts by weight (substantially 0.75 mole) of 98% piperidine. 42 cc. of 25% sulfuric acid was added slowly with stirring at a temperature of 20° C. Thereafter, 177 parts by weight (substantially 0.289 mole) of 12% sodium hypochlorite solution was added over a period of 2 hours at 19° C. with stirring. An oil separated out and was taken up with ether, washed neutral to litmus, and dried. A yield of 47 parts by weight (82.5% of theory) of a dark brown oil was obtained. Analysis of the compound believed to be a 15:85 mixture of N-cyclopentamethylene-4-ethyl thiazole sulfenamide and N-cyclopentamethylene-4,5-dimethyl thiazole sulfenamide follows:

|  | Theory | Found |
|---|---|---|
| Nitrogen | 12.2 | 11.8 |
| Sulfur | 28.1 | 28.3 |

EXAMPLE 2

36.5 parts by weight (substantially 0.25 mole) of a 15:85 ratio mixture of 2-mercapto-4-ethyl thiazole and 2-mercapto-4,5-dimethyl thiazole was dissolved in 40 parts by weight of 25% sodium hydroxide and to the solution so prepared was added 135.5 parts by weight (substantially 0.75 mole) of 25% dimethyl amine. 42 cc. of 25% sulfuric acid was added slowly with stirring. Thereafter, 132.7 parts by weight (substantially 0.305 mole) of a 17.1% sodium hypochlorite solution was added with stirring over a period of 1⅔ hours at a temperature of 15° C. An oil separated out and was taken up with ether, washed neutral to litmus and dried. A yield of 33 parts by weight of a brown oil was obtained, substantially 70% of theory. The compound was believed to be a 15:85 mixture of N,N'-dimethyl-4-ethyl thiazole sulfenamide and N,N'-dimethyl-4,5-dimethyl thiazole sulfenamide.

EXAMPLE 3

36.5 parts by weight (substantially 0.25 mole) of a 15:85 ratio mixture of 2-mercapto-4-ethyl thiazole and 2-mercapto-4,5-dimethyl thiazole was dissolved in 40 parts by weight of a 25% sodium hydroxide solution and to the solution so prepared was added 55 parts by weight (substantially 0.75 mole) of diethyl amine. 42 cc. of 25% sulfuric acid was added slowly with stirring at a temperature of 13° C. Thereafter, 220 parts by weight (substantially 0.3 mole) of a 14% sodium hypochlorite solution was added over a period of 2 hours at about 20° C. An oil separated out and was taken up with ether, washed neutral to litmus, and dried. A yield of 45 parts by weight of a dark brown oil was obtained, 83% of theory. Analysis for nitrogen and sulfur in the compound believed to be a 15:85 mixture of N,N'-diethyl-4-ethyl thiazole sulfenamide and N,N'-diethyl-4,5-dimethyl thiazole sulfenamide follows:

|  | Theory | Found |
|---|---|---|
| Nitrogen | 12.9 | 12.5 |
| Sulfur | 29.6 | 29.9 |

Mono ethyl amine and mono methyl amine were condensed with a 15:85 mixture of 2-mercapto-4-ethyl thiazole and 2-mercapto-4,5-dimethyl thiazole by the above described procedure to form the corresponding sulfenamides. The processing safety of stocks containing these compounds was compared to stocks containing the corresponding secondary amine analogues. Vulcanizable stocks were compounded comprising

|  | Parts by weight |
|---|---|
| Smoked sheet rubber | 100 |
| Zinc oxide | 5 |
| Sulfur | 3 |
| Stearic acid | 1 |
| Accelerator | 1 |

The stability of the stocks to heating below usual vulcanizing temperatures was determined by heating at 121° C. and measuring the plasticity by means of a Mooney plastometer after various heating times.

| Accelerator | Plasticity—Mooney Units after heating— | | | | | |
|---|---|---|---|---|---|---|
|  | 1 min. | 4 mins. | 7 mins. | 10 mins. | 16 mins. | 25 mins. |
| N-Methyl-4-ethyl and 4,5-dimethyl thiazole sulfenamide | 27 | 34 | 112 |  |  |  |
| N-Dimethyl-4-ethyl and 4,5-dimethyl thiazole sulfenamide | 29 | 27 | 25 | 24 | 24 | 29 |
| N-Ethyl-4-ethyl and 4,5-dimethyl thiazole sulfenamide | 30 | 29 | 72 | 146 | 199 |  |
| N-Diethyl-4-ethyl and 4,5-dimethyl thiazole sulfenamide | 33 | 26 | 24 | 23 | 22 | 22 |
| Cyclopentamethylene-4-ethyl and 4,5-dimethyl thiazole sulfenamide | 29 | 27 | 25 | 24 | 24 | 29 |

These data show that the new sulfenamides which contain no hydrogen on the amide nitrogen exhibit remarkable delayed action and are much superior to accelerators of analogous structure but which contain hydrogen on the amide nitrogen atom.

The new compounds are powerful accelerators which compare favorably with the widely used arylene thiazole sulfenamides. As exemplary of the accelerating activity of the new products but again without limiting the invention, stocks were compounded comprising

| Stock | A | B | C |
|---|---|---|---|
| Smoked sheet rubber parts by weight | 100 | 100 | 100 |
| Zinc oxide do | 5 | 5 | 5 |
| Sulfur do | 3 | 3 | 3 |
| Stearic acid do | 1 | 1 | 1 |
| N-Dimethyl-4-ethyl and 4,5-dimethyl thiazole sulfenamide parts by weight | 1 |  |  |
| N-Cyclopentamethylene-4-ethyl and 4,5-dimethyl thiazole sulfenamide parts by weight |  | 1 |  |
| N-Cyclohexyl benzothiazole sulfenamide do |  |  | 1 |

The stocks so compounded were cured by heating for different periods of time in a press at 126° C. The physical properties of the cured products are set forth below.

Table I

| Stock | Cure Time in Mins. | Modulus of Elasticity in lbs./in.$^2$ at Elongations of— | | Ultimate Tensile, lbs./in.$^2$ | Ultimate Elongation, Percent |
|---|---|---|---|---|---|
|  |  | 300% | 500% |  |  |
| A | 30 | 197 | 785 | 3,457 | 735 |
| B | 30 | 90 | 400 | 2,485 | 785 |
| C | 30 | 117 | 502 | 2,653 | 763 |
| A | 45 | 260 | 1,063 | 3,715 | 650 |
| B | 45 | 192 | 832 | 3,850 | 765 |
| C | 45 | 300 | 1,110 | 4,107 | 710 |
| A | 60 | 397 | 1,668 | 3,878 | 650 |
| B | 60 | 347 | 1,612 | 3,687 | 638 |
| C | 60 | 472 | 1,998 | 3,614 | 612 |

It is evident from the above data that although the stocks were resistant to cure at 121° C., they cured readily at 126° C. producing vulcanizates having physical properties comparable to those obtained with the commercial accelerator N-cyclohexyl-2-benzothiazole sulfenamide. The processing safety in a stock containing furnace carbon black is greater than exhibited by the said commercial accelerator. This is surprising in view of the fact that in the gum stocks described above the processing safety was somewhat less.

EXAMPLE 4

36.5 parts by weight (substantially 0.25 mole) of a 15:85 ratio mixture of 2-mercapto-4-ethyl thiazole and 2-mercapto-4,5-dimethyl thiazole was mixed with 30 parts by weight (substantially 0.34 mole) of morpholine and 75 parts by weight of water. To the well-stirred mixture there was gradually added 24.8 parts by weight of sodium hypochlorite as a dilute aqueous solution. The temperature was kept at 50–55° C. during the addition. Sodium sulfite was then added to remove any excess oxidizing agent and the organic layer separated from the aqueous layer. The oil layer was centrifuged to separate a further quantity of water and then filtered through a layer of Attapulgus clay. An 82.2% yield of brown oil was obtained in this manner constituting a mixture of sulfenamides, 4-[4,5-dimethyl-(4-ethyl)-2-thiazolyl mercapto]morpholine.

EXAMPLE 5

Into a glass or glass-lined reactor of suitable capacity was charged 32.8 parts by weight (0.25 mole) of 4-methyl-2-mercapto thiazole, 25 parts by weight (0.275 mole) of morpholine and 100 parts by weight of water. The mixture was stirred until a clear solution resulted and then 28 parts by weight of sodium hypochlorite in the form of a dilute aqueous solution was gradually added over a period of about 90 minutes while keeping the temperature of the reaction mixture at 35–40° C. 5 parts by weight of sodium sulfite was then added to remove any excess oxidizing agent and stirring continued for 15 minutes. The mass was then cooled to 20° C., filtered and the separated solids washed with water until the wash water was neutral. A 63% yield of the sulfenamide, M. P. 60–62° C., was isolated in this manner. Analysis for nitrogen gave 12.96% and for sulfur 30.02%, as compared to 12.95% nitrogen and 29.6% sulfur calculated for 4-[4-methyl-2-thiazolyl mercapto]-morpholine.

By furnace blacks are meant carbon blacks made by the furnace process. As has been stated furnace blacks are characterized by the property of activating the cure in contrast to channel blacks which retard cure. These include products referred to as semi-reinforcing furnace blacks as for example Pelletex as well as newer blacks having greater reinforcing properties. These latter may be called high reinforcing furnace blacks and are variously referred to in the trade as fine furnace black, high modulus furnace black, medium abrasion furnace black, high abrasion furnace black and reinforcing furnace black. They are available under a variety of trade names, some of which are Sterling L, Sterling 80, Sterling 105, Philblack 0, Philblack A, Statex K, Statex R, Statex 93, Kosmo 60, Vulcan 1, Vulcan 3, Continex HMF, Modulus and Aromex. While it is next to impossible to scorch a pure gum compound accelerated with N-cyclohexyl-2-benzothiazole sulfenamide at 121° C., the addition to a base stock containing 0.5 part by weight of this accelerator and 2.5 parts by weight sulfur on the rubber of 20 parts by weight high reinforcing furnace black gives a stock having a decided tendency to scorch below curing temperature. Increasing the proportion of black increases the tendency to scorch still more up to at least 50 parts by weight. In general 20 to 80 parts by weight on the rubber of furnace black cover the usual compounding practice although still lower proportions induce definite scorching tendencies. Accordingly, it has not heretofore been possible to adopt the reinforcing furnace blacks for the general compounding of natural rubber.

The term "rubber" unless otherwise modified as used in the specification and claims is intended in its generic sense to include rubber substitutes, natural rubber, synthetic rubber and the like.

This application is a continuation-in-part of application Serial No. 47,538, filed September 2, 1948.

What is claimed is:

1. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

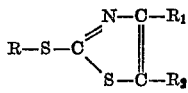

where R represents a secondary amino substituent having the nitrogen atom linked directly to the sulfur atom selected from the group consisting of six membered heterocyclic amino radicals having two —CH₂— groups linked to the hetero nitrogen atom, dialkyl amino radicals and diaralkyl amino radicals, R₁ and R₂ are members of the group consisting of hydrogen and alkyl radicals, at least one of which is an alkyl radical.

2. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

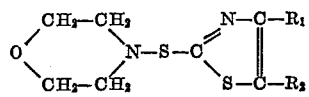

where R₁ and R₂ are alkyl radicals.

3. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

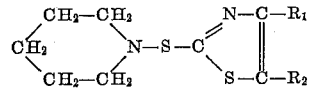

where R₁ and R₂ are members of the group consisting of hydrogen and alkyl radicals, at least one of which is an alkyl radical.

4. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

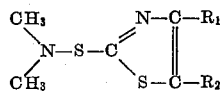

where R₁ and R₂ are members of the group consisting of hydrogen and alkyl radicals, at least one of which is an alkyl radical.

5. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

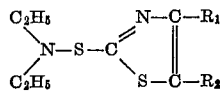

where R₁ and R₂ are members of the group consisting of hydrogen and alkyl radicals, at least one of which is an alkyl radical.

6. In the process of vulcanizing a sulfur vulcanizable rubber by heating the rubber in the presence of organic accelerator and a vulcanizing agent consisting of elemental sulfur, the improvement wherein the organic accelerator consists of a small amount of a compound of the general formula

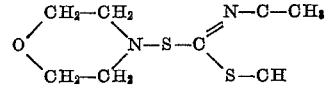

References Cited in the file of this patent
UNITED STATES PATENTS

| | | |
|---|---|---|
| Re. 19,286 | Zaucker et al. | Aug. 21, 1934 |
| 2,284,578 | Jones | May 26, 1942 |
| 2,338,864 | Mathes | Jan. 11, 1944 |
| 2,445,722 | Carr et al. | July 20, 1948 |
| 2,560,045 | Smith | July 10, 1951 |
| 2,581,936 | Carr | Jan. 8, 1952 |
| 2,582,829 | Harbison | Jan. 15, 1952 |